US006683607B1

(12) United States Patent
Matsuda et al.

(10) Patent No.: US 6,683,607 B1
(45) Date of Patent: Jan. 27, 2004

(54) METHOD FOR DISPLAYING THREE-DIMENSIONAL OBJECTS AND A COMPUTER-READABLE STORAGE MEDIUM STORING A PROGRAM FOR ACHIEVING THE SAME

(75) Inventors: Kazuyuki Matsuda, Ohme (JP); Masanori Kakimoto, Tokyo (JP)

(73) Assignee: SGI Japan, Ltd., Tokyo (JP)

( * ) Notice: Subject to any disclaimer, the term of this patent is extended or adjusted under 35 U.S.C. 154(b) by 420 days.

(21) Appl. No.: 09/636,098

(22) Filed: Aug. 10, 2000

(30) Foreign Application Priority Data

Aug. 23, 1999 (JP) .............................. 11-236161

(51) Int. Cl.⁷ ................................ G06T 15/00

(52) U.S. Cl. ...................... 345/419; 345/420; 345/421; 345/424

(58) Field of Search ................................ 345/419, 420, 345/421, 422, 423, 424, 426, 681, 589, 620, 623, 964

(56) References Cited

PUBLICATIONS

Zirbel et al. "Using Auto Cad" pp. 371–384, 487–508, 518, 550–551, 943–947, 1995.*
Rossignac et al., "Interactive Inspection of Solids: Cross–sections and Interferences" ACM Computer Graphics, pp. 353–360, Jul., 1992.*
Mason, Woo, et al., "Open GL® Programming Guide," Third Edition, *Silicon Graphics, Inc.*, 1999, 730 pages.
"Programming with OpenGL: Advanced Techniques Course Notes," SIGGRAPH '97 24 International Conference on Computer Graphics and Interactive Techniques, May 1, 1997.

* cited by examiner

*Primary Examiner*—Almis R. Jankus
(74) *Attorney, Agent, or Firm*—Baker Botts L.L.P.

(57) ABSTRACT

A graphics system improves the efficiency in measurement operations of three-dimensional objects by enabling a user to easily and accurately specify the measurement point of the three-dimensional objects on a screen. A user can obtain the display of horizontal and vertical distances between surfaces of three-dimensional objects by specifying a point on the screen displaying the sectioned three-dimensional objects. Also, the graphics system can display three-dimensional objects whose parts are readily distinguishable by color from each other.

6 Claims, 9 Drawing Sheets

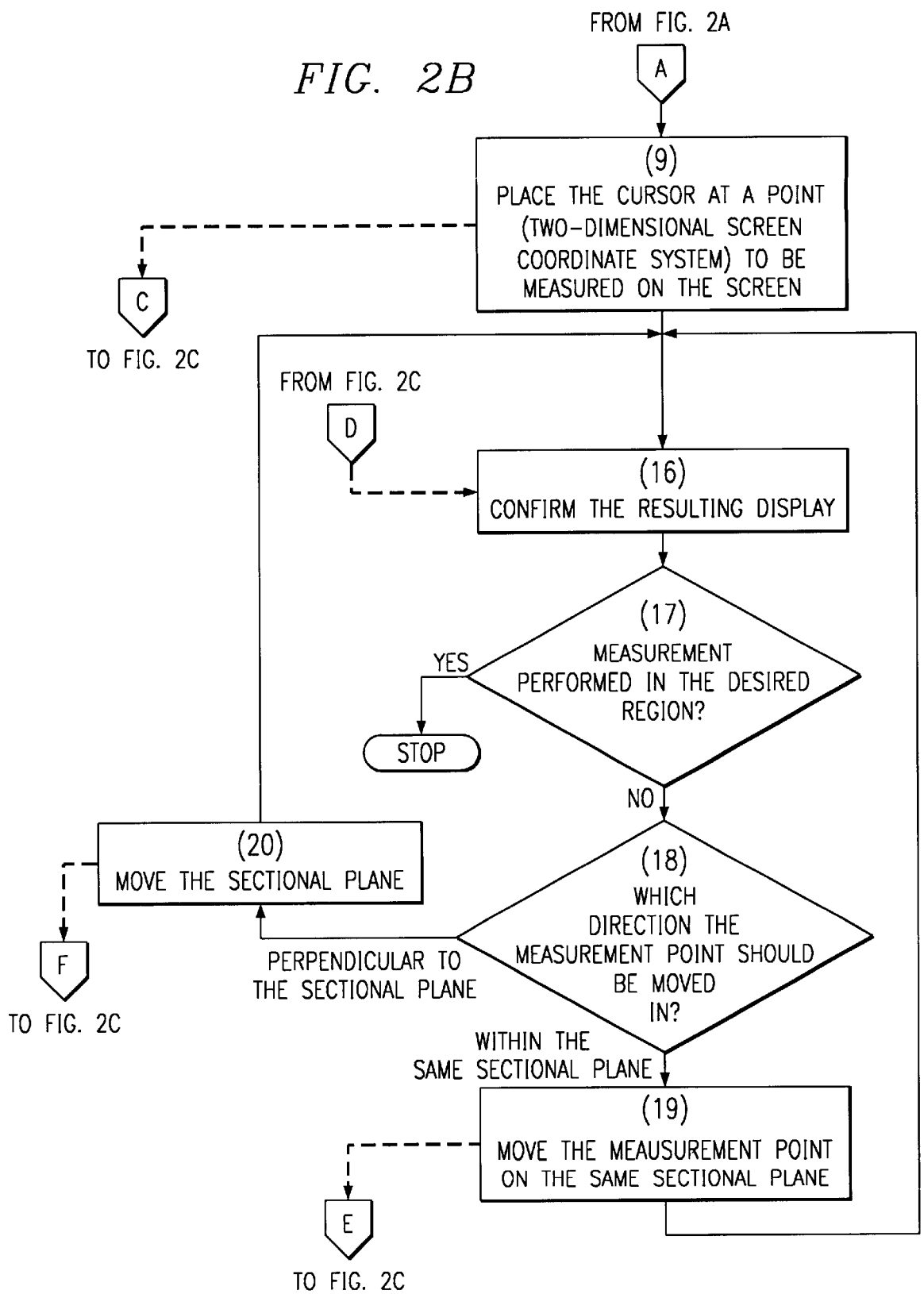

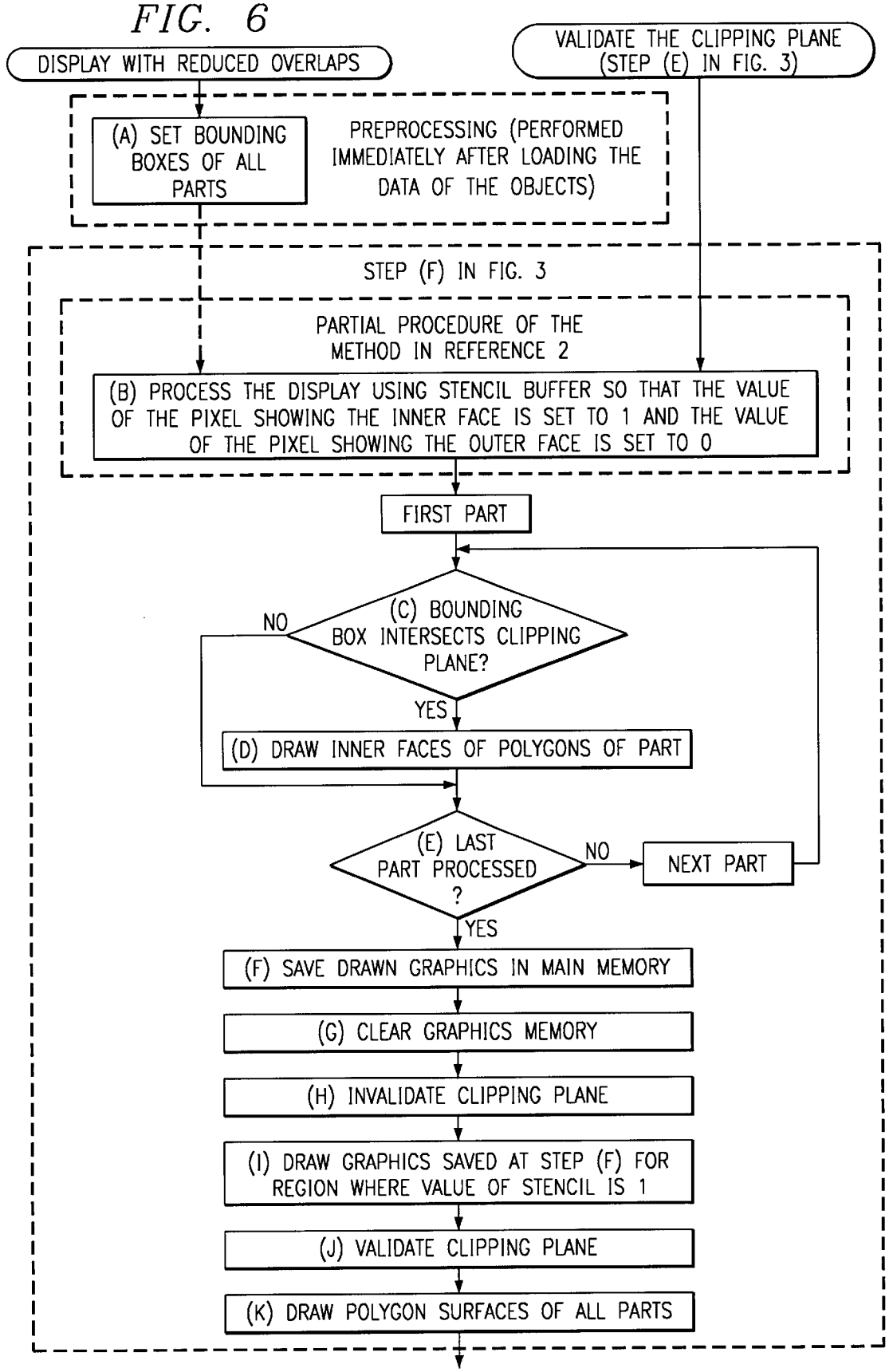

FIG. 9
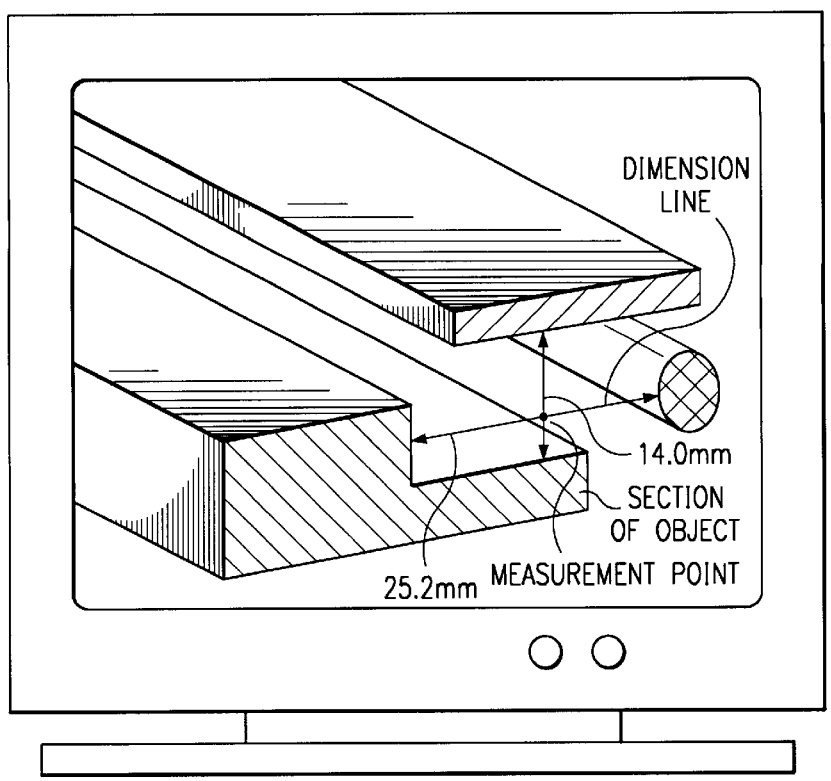
FIG. 10A
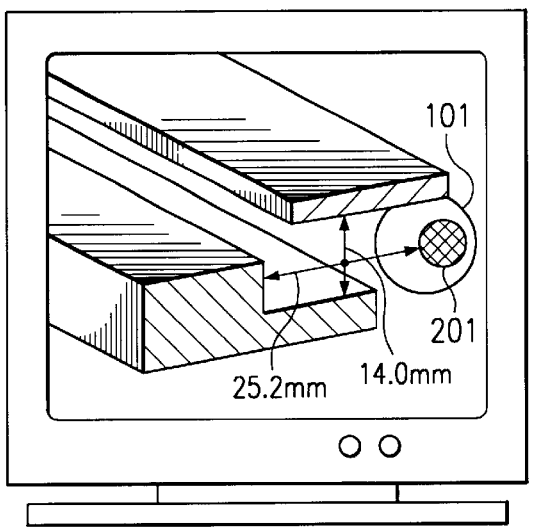
FIG. 10B
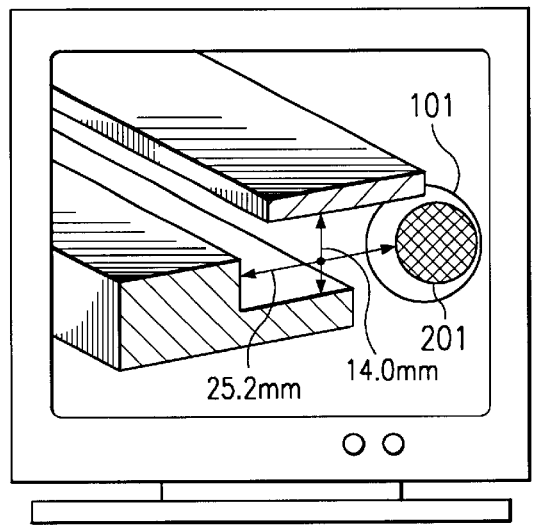
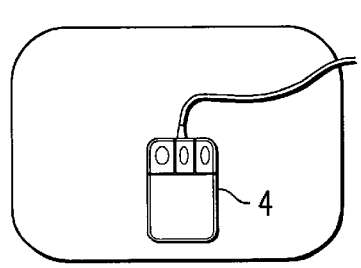
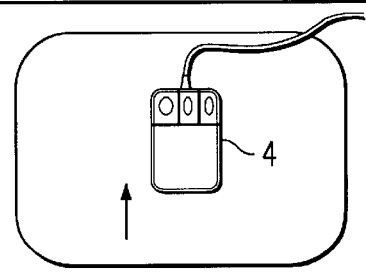

*FIG.11A*
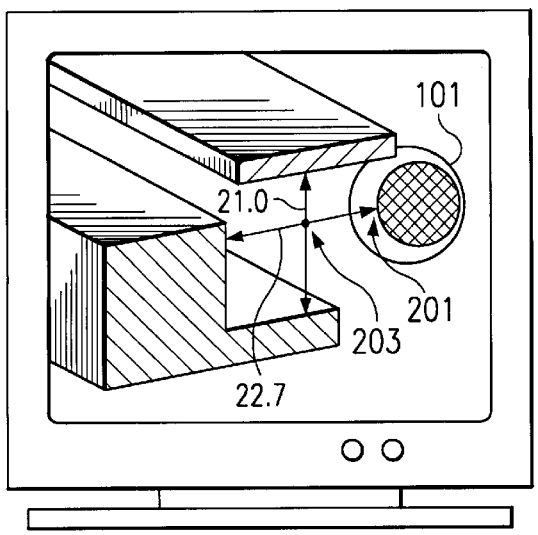
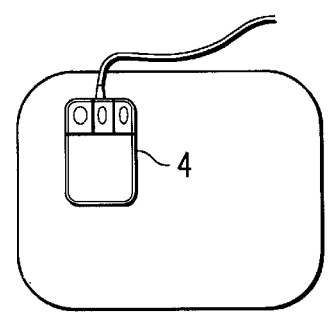
*FIG.11B*
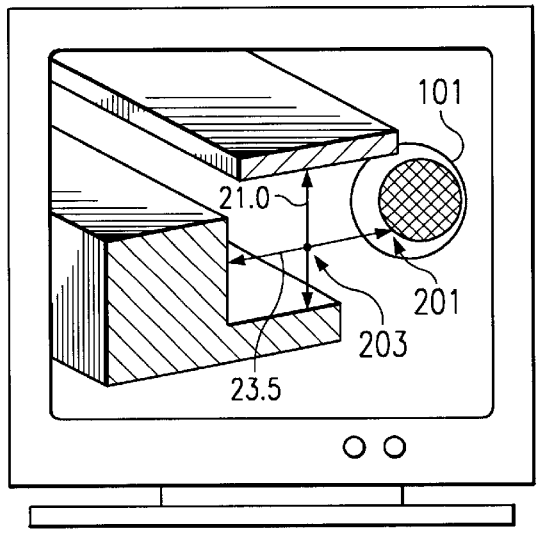
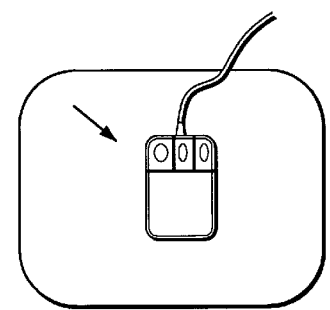
*FIG.11C*
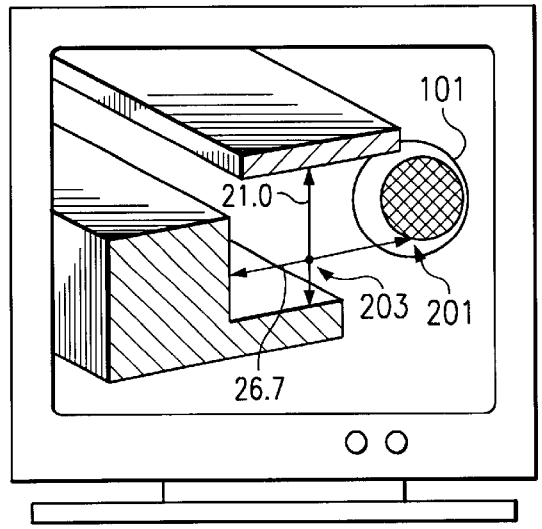
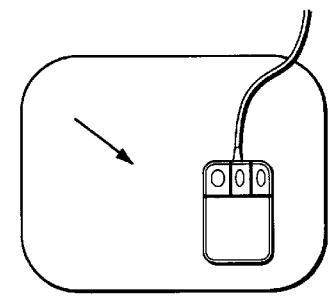

METHOD FOR DISPLAYING THREE-DIMENSIONAL OBJECTS AND A COMPUTER-READABLE STORAGE MEDIUM STORING A PROGRAM FOR ACHIEVING THE SAME

TECHNICAL FIELD OF THE INVENTION

The present invention relates to a method for displaying three-dimensional objects using a computer and a computer-readable storage media storing a program for achieving the same.

BACKGROUND OF THE INVENTION

Conventionally, when displaying the sections of three-dimensional objects on the screen of a computer, the sections of all parts of the object have been displayed in the same color. Thus, it is difficult to distinguish one part from another by its section. In addition, when measuring the distance between two points in a three-dimensional space on the screen, a user views the three-dimensional objects on the screen and specifies the two points to be measured using an input device such as a mouse. It is difficult for the user to specify the positions on the surface of the three-dimensional objects in the two-dimensional space on the screen, and the operation requires considerable time and effort if it has to be carried out repeatedly.

SUMMARY OF THE INVENTION

In accordance with the present invention, a method is provided for displaying three-dimensional objects whose parts are readily distinguishable from each other. In a particular embodiment, the present invention provides a method for displaying three-dimensional objects, where the measurement points of the three-dimensional objects on the screen can be easily and accurately specified and the distance-measuring operation of the three-dimensional objects facilitated.

According to one embodiment of the present invention, a method for displaying three-dimensional objects on a screen includes: displaying three-dimensional objects which are sectioned by a selected plane; determining the three-dimensional coordinates corresponding to a selected point as a measurement point on the screen displaying the sectioned three-dimensional objects; calculating the horizontal and vertical distances between the surfaces of the three-dimensional objects on the sectional plane passing through the measurement point; and displaying the values of the calculated horizontal and vertical distances together with dimension lines.

In accordance with another embodiment, the present invention provides a method for displaying three-dimensional objects on a screen that includes displaying the three-dimensional objects sectioned by a selected plane, wherein the sections of the three-dimensional objects are displayed in distinguishable solid colors representing different parts.

In accordance with yet another embodiment of the present invention, a computer-readable storage medium storing a program that when executed on a computer is operable to: display three-dimensional objects on a screen; accept the selection of the sectional plane of the three-dimensional objects displayed on the screen; display the three-dimensional objects sectioned by the select plane; accept the selection of a point on the screen which displays the sectioned three-dimensional objects; determine the three-dimensional coordinates corresponding to the selected point as a measurement point; calculate the horizontal and vertical distances between the surfaces of the three-dimensional objects; and display the calculated values of the horizontal and vertical distances together with dimension lines on the screen.

In still another embodiment of the present invention, a computer-readable storage medium for execution on a computer is operable to: display three-dimensional objects on a screen; accept the instruction to select a sectional plane on three-dimensional objects displayed on the screen; and display the three-dimensional objects sectioned by the selected sectional plane, the sections of the three-dimensional objects being displayed in distinguishable solid colors representing different parts.

The invention provides a number of technical advantages. Using the techniques of the present invention, the user can perform measurement operations of three-dimensional objects on a display in an efficient and repeatable manner. A user specifies a point on the screen displaying the sectioned three-dimensional objects and the point is converted into a measurement point in the three-dimensional coordinate system. The horizontal and vertical distances between the surfaces of the three-dimensional objects on the line passing through the measurement point are displayed together with their dimension lines. The user may move the sectional plane so that the display of the sectioned three-dimensional objects is updated with respect to the new position of the sectional plane. In addition, the measurement point corresponding to the new position of the sectional plane is automatically determined, and the values of the horizontal and vertical distances between the surfaces of the three-dimensional objects based on this measurement point, as well as dimension lines, are automatically updated. Accordingly, the distances between the surfaces of the three-dimensional objects with respect to many measurement points can be successively measured.

In still other technical advantages, the present invention distinguishes parts of three-dimensional objects to facilitate efficient measurement and graphics manipulation. In a particular embodiment, the sections of three-dimensional objects can be displayed in distinguishable solid colors representing the parts constituting objects. Other technical advantages of the present invention will be readily apparent to one skilled in the are from the following figures, descriptions, and claims.

BRIEF DESCRIPTION OF THE DRAWINGS

For a more a complete understanding of the present invention and its advantages, reference is now made to the following descriptions, taken in conjunction with the accompanying drawings, in which:

FIGS. 2A–2C illustrate a flowchart showing the procedure of the system along with the user operation;

FIG. 6 is a flowchart showing the displaying method for reducing overlaps with other parts using the system;

FIG. 9 is a display example of the sections of three-dimensional objects and dimension lines in the system;

FIGS. 10A–10B are examples of the change in the position of the sectional plane and the update of dimension lines of three-dimensional objects using the system;

FIGS. 11A–11C are examples of the change in the position of a measurement point and the update of dimension lines of three-dimensional objects using the system.

DETAILED DESCRIPTION OF THE INVENTION

Figure 1:
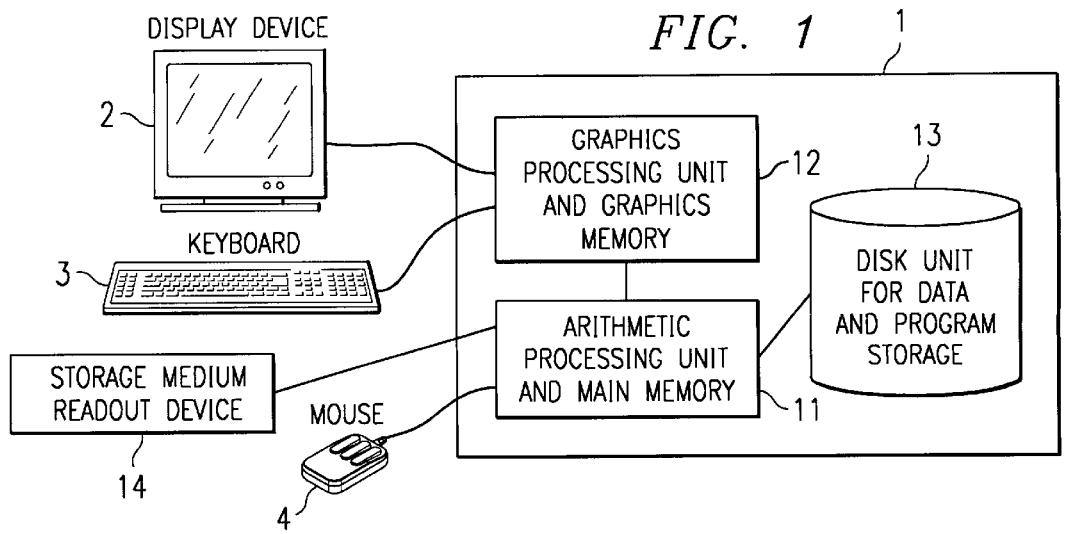
FIG. 1 is a block diagram showing one embodiment of a hardware structure for achieving the three-dimensional graphics system of the present invention.

FIG. 1 shows a hardware structure for achieving the three-dimensional graphics system which is an embodiment of the present invention. As shown in FIG. 1, this three-dimensional graphics system includes a computer main unit 1 such as a graphics workstation or a personal computer and a display device 2, such as a CRT display or an LCD, for displaying graphical data of the three-dimensional objects generated by the computer main unit 1. A keyboard 3 and a mouse 4 allow a user to input various control instructions and data to the computer main unit 1.

Computer main unit 1 includes an arithmetic processing unit 11 which executes and controls various operations and programs. Computer main unit 1 may also include a graphics processing unit 12 which is a special processing unit for creating the graphical data of the three-dimensional objects from input data such as geometric data, viewing location, position of the sectional plane, etc., and for outputting the graphical data to display device 2. A disk unit 13 includes any suitable volatile or non-volatile memory to store programs and data to operate the graphics system. In addition, the computer main unit 1 couples to a storage medium read device 14 which loads data and programs in the storage media, such as a floppy disk, CD-ROM, optical disk, or other suitable computer-readable storage medium. The method for displaying three-dimensional objects of this embodiment can be practiced, for example, in such environment that the program for achieving the present method is in the disk unit 13.

Figure 2A:
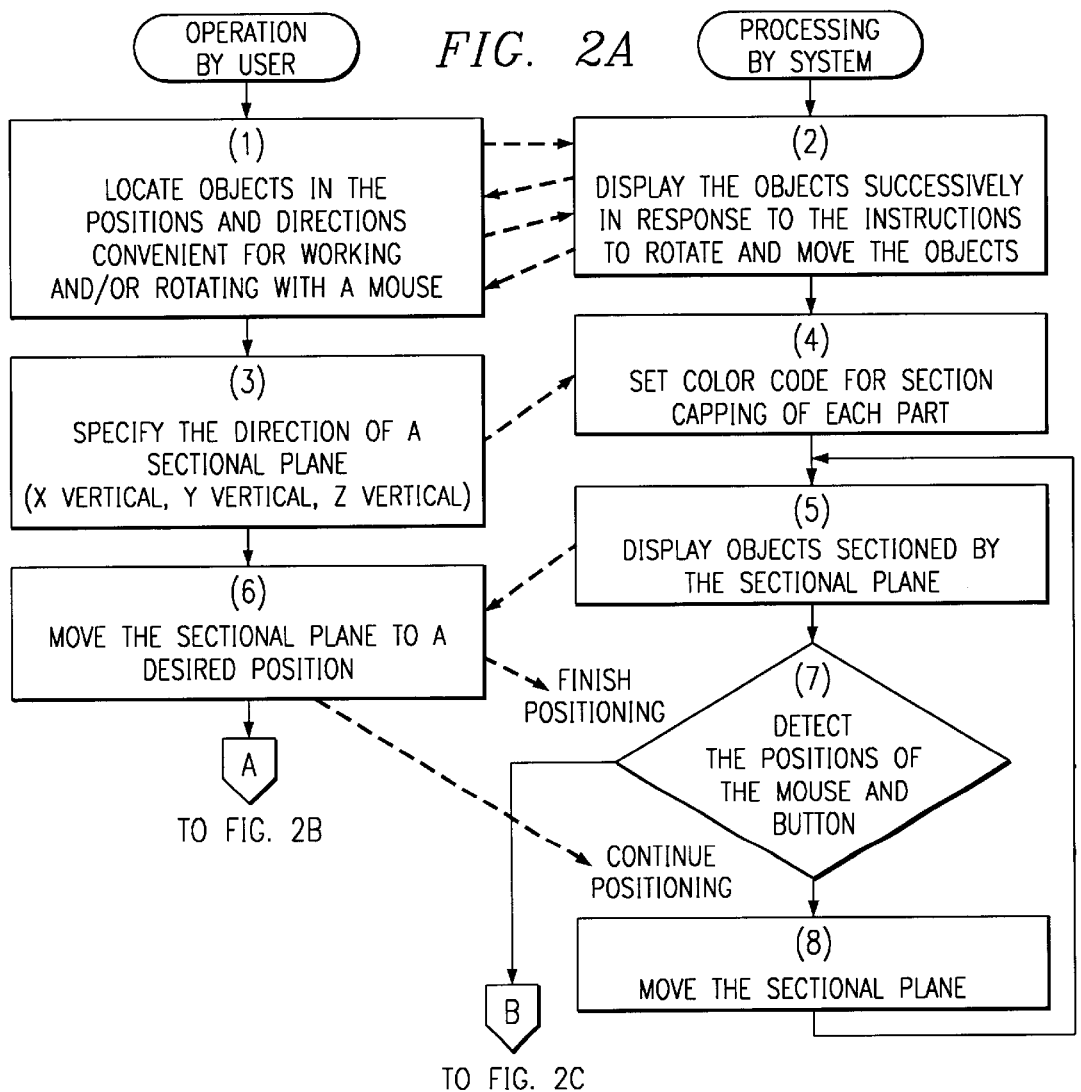
Figure 2C:
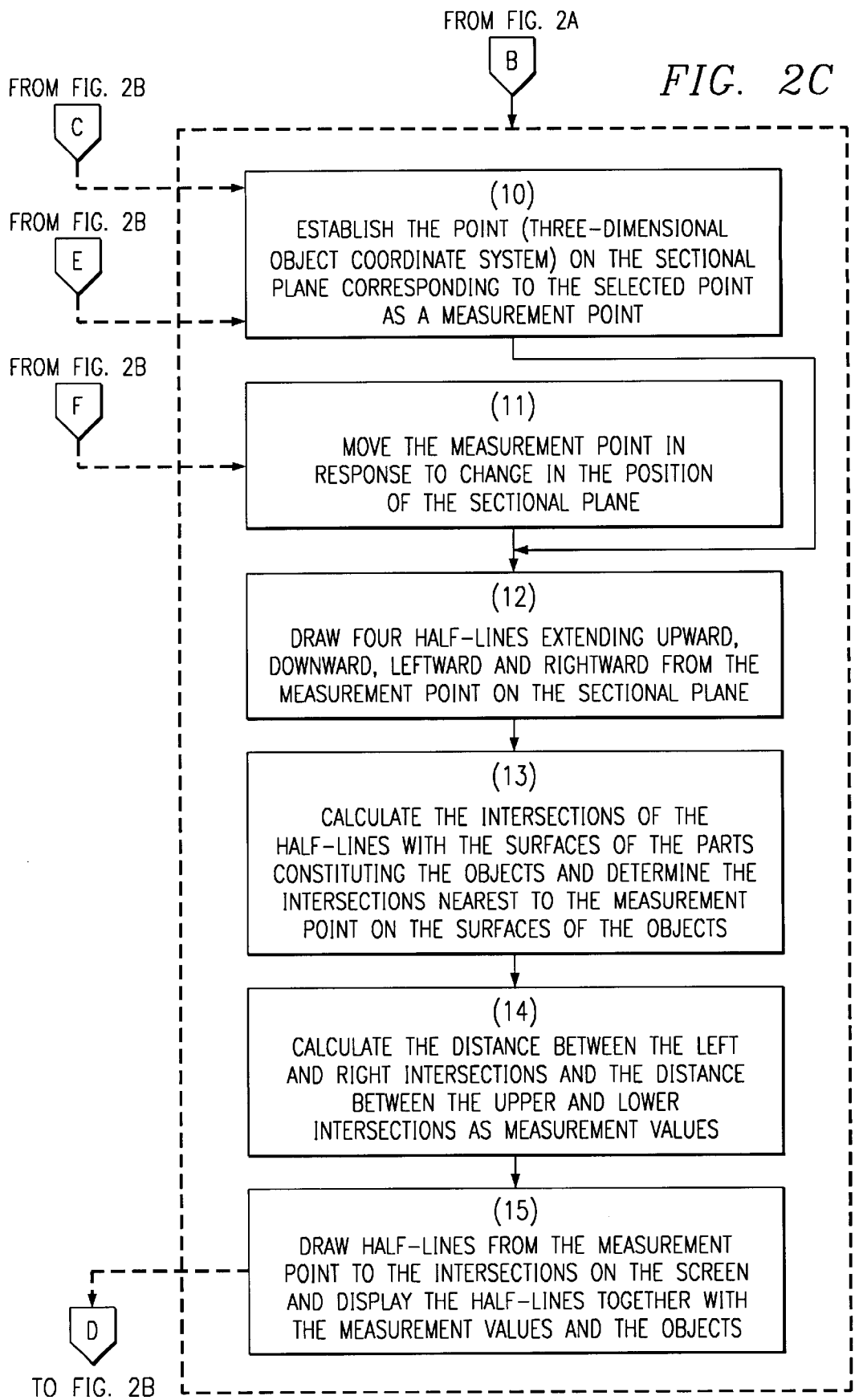

FIGS. 2A–2C illustrate a flowchart showing the processing procedure of this system along with the user's operation. In the procedure, step (2) may be Z-buffer method which is generally used as a three-dimensional display processing technique. Most of the accelerators and graphics workstations for three-dimensional display currently on the market utilize this method. The surface of a three-dimensional object is approximately represented as a large number of triangles (polygons). Such display processing by a Z-buffer method can be performed using existing techniques, such as OpenGL, for displaying three-dimensional objects.

The display of the section can be achieved, for example, by using the function of a special graphics memory called a stencil buffer. The detailed description of the stencil buffer is described in Reference 1: "OpenGL Programming Guide Second Edition—OpenGL version 1.1 Official Guide," Addison-Wesley Publishers Japan Co., ISBN4-7952-9710-X (C3055). Due to the recent progress in the performance of graphics processing devices, it is relatively easy to quickly display the three-dimensional objects in response to user commands entered using keyboard 3 and/or mouse 4.

In steps (4) and (5), the sections of the three-dimensional objects are displayed. The processing in these steps is described below in FIG. 3 in detail. In step (6), the user operates mouse 4 to move the sectional plane and specify the desired position of the sectional plane. In step (9), the user moves the cursor to a position near the middle of the objects the distances between which are to be measured on the specified sectional plane displayed on the screen, and specifies the measurement point. In step (10), the system converts the two-dimensional coordinates of the cursor into three-dimensional coordinates by considering the cursor to be on the sectional plane of the three-dimensional objects. The measurement point is set to these three-dimensional coordinates.

Further, the system performs the following processing. In step (12), the system draws four half-lines upward, downward, rightward and leftward from the given measurement point as a starting point along the sectional plane. For example, when the sectional plane is perpendicular to the z-axis (parallel to the x-y plane), the half-lines are parallel to either the x-axis or the y-axis. In step (13), the system calculates the intersections of the four half-lines with the triangles on the surfaces of all the objects to be displayed, and determines the intersections nearest to the measurement point.

In step (14), the system determines the distance between the left and right intersections and the distance between the upper and lower intersections as measurement values. When the measurement point is on the section of an object, the measurement value represents the thickness of the object. When the measurement point is in empty space, the value represents the distances between two objects. Finally in step (15), the system displays the four line segments extending upward, downward, leftward and rightward from the measurement point and their measurement values together with the objects on the screen. An example of the resulting display is shown in FIG. 9.

The user views the display as in FIG. 9 in step (16) and checks if the measurement of the desired region is displayed in step (17). If the measurement point needs to be changed, the user decides in which direction the measurement point should be moved in step (18). If the position of the sectional plane does not change, the measurement point moves on the sectional plane in step (19). In a particular embodiment, the cursor is moved onto the measurement point with the mouse 4 and the left button of the mouse 4 is pushed to select the measurement point. The cursor is then moved to the desired position. The position of the sectional plane is moved if necessary. For example, the sectional plane may be moved by pushing the middle button of the mouse 4 and then moving in the desired direction and to the desired position. The processing of steps (10) to (15) are conducted so that the display is updated whenever the position of the measurement point or sectional plane is changed by the user operating the mouse 4.

Figure 12A:
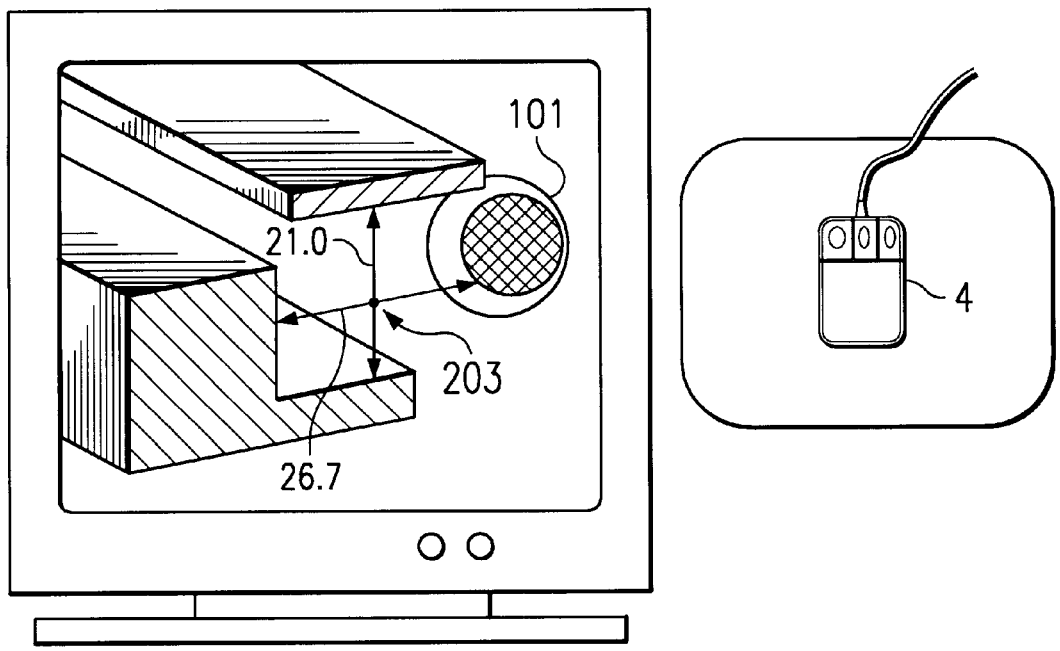
FIGS. 12A–12B are additional examples of the change in the position of a measurement point and the update of dimension lines of three-dimensional objects using the system.
Figure 12B:
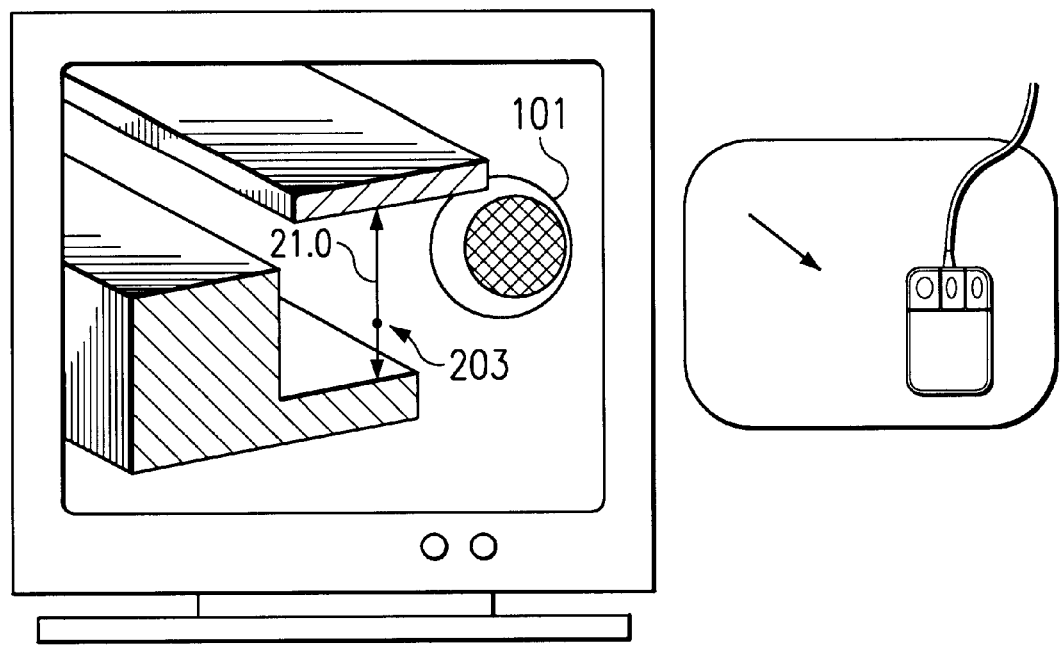

FIGS. 10A–10B show an example of the dimension lines and measurement values updated as the sectional plane is moved by operating mouse 4. As the sectional plane moves, the intersection 201 of a sphere 101 on the right side of the screen with the dimension lines changes, and so do the measurement values. FIGS. 11A–11C show an example of the dimension lines and measurement values updated as the measurement point 203 is moved on the sectional plane by operating mouse 4. As the measurement point 203 moves, the intersection 201 of the sphere 101 on the right side of the screen with the dimension lines changes, and so do the measurement values. FIGS. 12A–12B show an example of the display when the dimension lines do not intersect the objects as a result of the movement of measurement point 203 on the sectional plane by operating mouse 4. In this case, the horizontal dimension line is not displayed because it does not intersect the sections of the objects. As an option, the dimension lines which do not intersect the objects may be represented, for example, as dotted half-lines or dotted straight lines.

Figure 3:
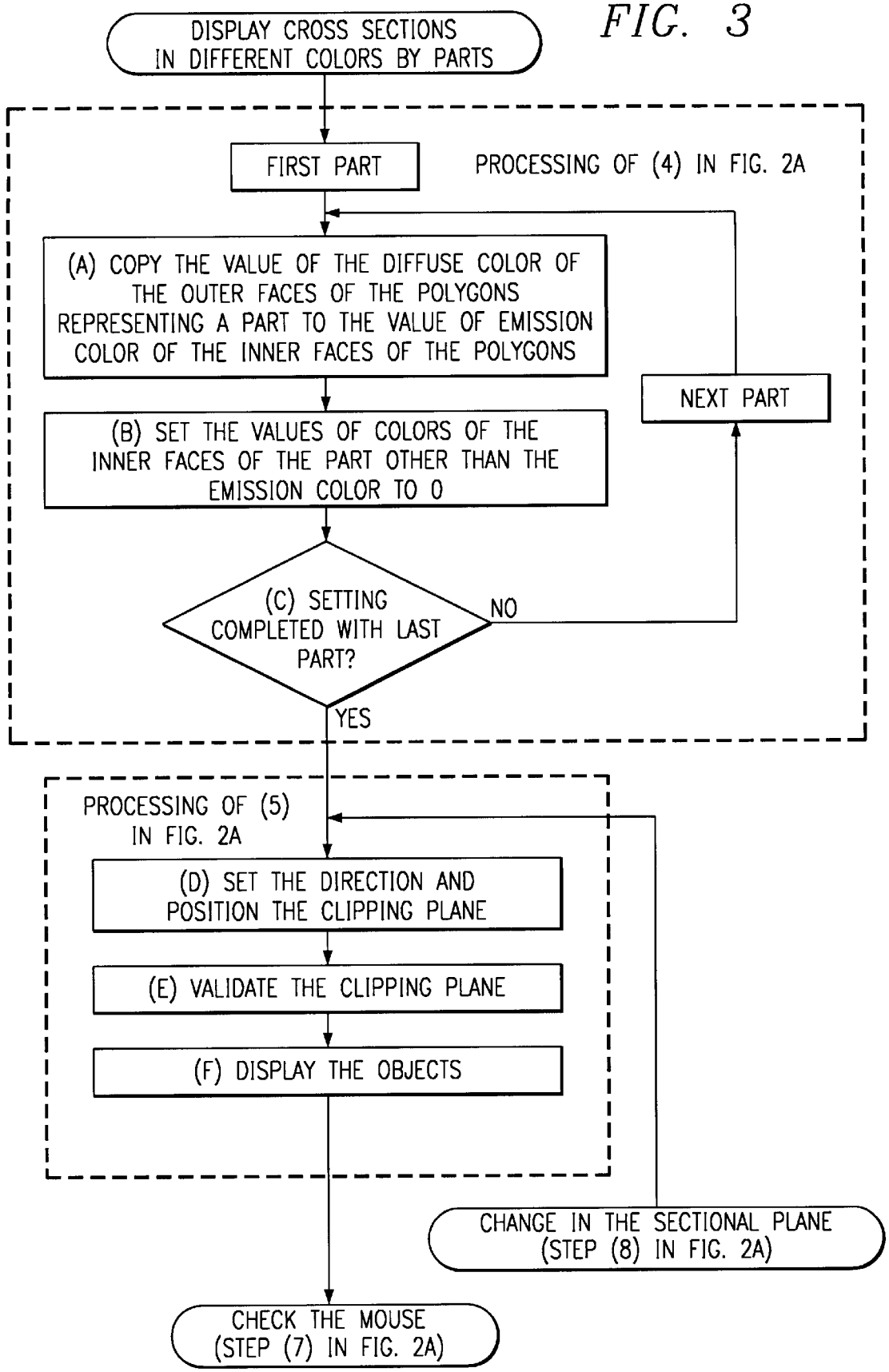
FIG. 3 is a flowchart showing the processing procedure for displaying sections of three-dimensional objects in the system.
Figure 4:
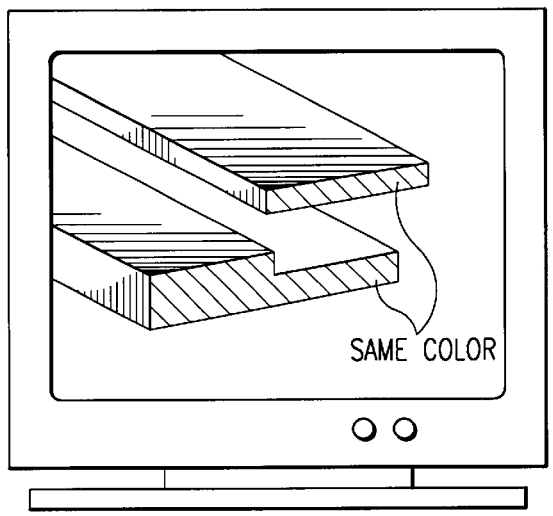
FIG. 4 is an example of the conventional display of section capping.
Figure 5:
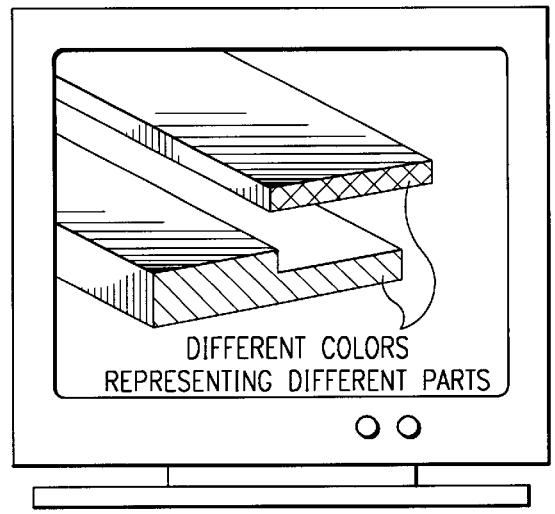
FIG. 5 is an example of the display of section capping in the system.

Next, the method for displaying sections of three-dimensional objects as shown in FIG. 3 is described. It is premised that all the objects constitute polygons to reproduce their surfaces, and the surfaces of the objects are the outer faces of the polygons. In other words, the inner faces of the polygons are not seen unless the objects are sectioned. The method for displaying a section not as a hollow portion but as a capped portion is called capping. This method is disclosed, for example, in Reference 2: "Programming with OpenGL: Advanced Techniques," SIGGRAPH '97 Course Notes 11, pp. 7–8 (August 1997). In this method, although the parts are displayed in different colors, the capped portions are displayed in a single color regardless of the parts. An example of this is shown in FIG. 4. In the graphics system, on the other hand, the sections are displayed in different colors by parts. This is shown in FIG. 5.

Steps (a), (b) and (c) in FIG. 3 correspond to step (4) in the flowchart of FIGS. 2A–2C and are the processing for color-coding the parts. In step (a), diffuse color of a part is detected. Diffuse color changes its darkness depending on the direction of the light source and is already assigned to the outer faces of the polygons. The value of the diffuse color is copied to the value of emission color which is assigned to the inner faces of the polygons. Emission color is invariable and independent of the light source. Next, in step (b), the values of the colors other than the emission color (ambient, diffuse and specular colors) on the inner faces of the polygons are set to zero. Subsequently in step (c), such color code is applied to all parts, and then the actual display of the sectional plane is performed. The sectional plane is called a clipping plane in the OpenGL architecture.

Figure 7:
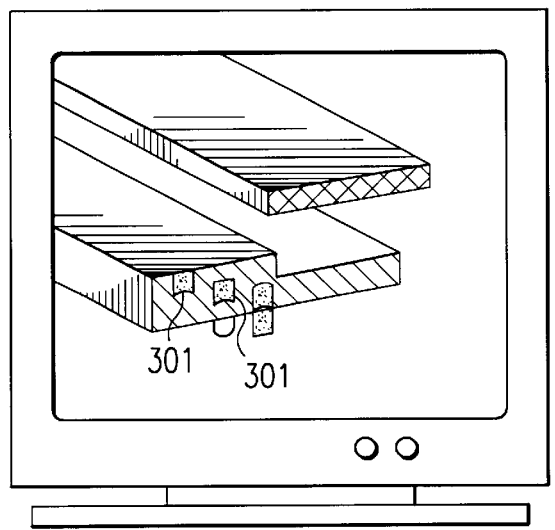
FIG. 7 is a display example showing many overlaps of parts.

Steps (d), (e) and (f) in FIG. 3 are the processing of the section display corresponding to step (5) in the flowchart of FIGS. 2A–2C. In step (d), the direction and position of the clipping plane is set appropriately, and the clipping plane is validated in step (e). Finally in step (f), the objects are displayed. In this manner, the inside portions exposed after the parts are sectioned by the sectional plane are displayed in solid colors representing the characteristics of the respective parts. In the resulting display, the objects appear as if they have been processed by capping (FIG. 5). This method is premised on the idea that the parts do not overlap with each other. In general, the objects designed by CAD do not overlap with each other, however, overlapping may happen due to the design of the objects. In this case, as shown in FIG. 7, it seems as if the inner faces 301 of other parts are floating on the section displayed in a solid color.

The graphics system also employs a method whereby these overlaps are reduced as much as possible. The procedure of the method is shown in FIG. 6. In step (A), as a preprocessing, the bounding boxes of all parts are determined after loading the data of the objects. A bounding box is the smallest box which surrounds a part and has ridgelines parallel to the x-, y- or z-axis, represented by two points (Xmin, Ymin, Zmin), (Xmax, Ymax, Zmax). In the actual display processing, drawing is processed using a special graphics memory called a stencil buffer while validating the clipping plane in step (B). The processing is performed so that if a pixel represents the inner face of the polygon, the value of the pixel is 1, whereas the pixel represents the outer face of the polygon, the value of the pixel is 0. This is achieved by the method disclosed in Reference 2.

Figure 8:
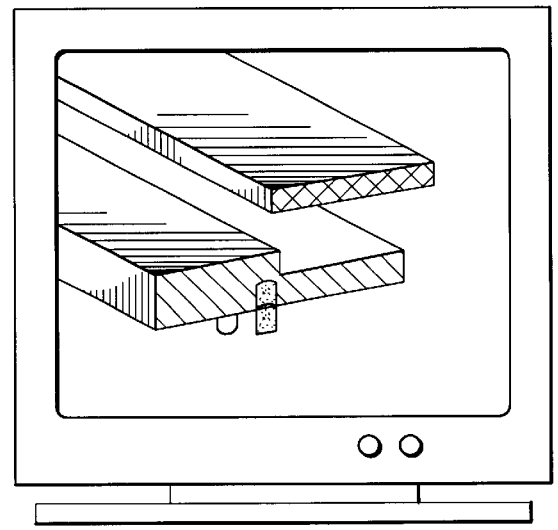
FIG. 8 is a display example with reduced overlaps of parts.

The further steps are the method for reducing overlaps according to the graphics system. In step (C), it is determined if the bounding box of each part intersects the clipping plane. If it does, there is a possibility that the inner faces of other parts are displayed as sections. Therefore, the inner faces of the polygons representing the part are drawn. In step (E), every part undergoes this processing. In step (F), the resulting drawing is stored in the main memory as an image. In this step, the parts which do not intersect the sectional plane are not drawn. In step (G), the graphics memory is temporarily cleared to invalidate the clipping plane. In step (I), the stored image is drawn only in the regions where the value of the stencil is 1. Finally in step (J), the clipping plane is validated, and the surfaces of all parts are drawn in step (K). By the above-described method, the parts which do not intersect the sectional plane, or the unrelated parts, can be removed from the display and the overlaps of the objects can be reduced, as shown in FIG. 8.

As explained above, a user specifies a point on the screen displaying sectioned three-dimensional objects, whereby the specified point is converted into a measurement point in the three-dimensional coordinate system and the horizontal and vertical distances between the surfaces of the three-dimensional objects on the line passing through the measurement point can be displayed together with dimension lines. This results in the advantage of facilitated operation of the end point compared to the conventional method of specifying the two end points step by step.

In addition, by moving the position of the sectional plane by user operation, the display of the sectioned three-dimensional objects is updated with respect to the new position of the sectional plane, and the measurement point corresponding to the new position of the sectional plane is automatically determined. The values of the horizontal and vertical distances between the surfaces of the three-dimensional objects are automatically updated, as well as the dimension lines. Therefore, the horizontal and vertical distances between the surfaces of the three-dimensional objects with respect to many measurement points can be successively determined.

Furthermore, the three-dimensional objects can be displayed in distinguishable solid colors which represent the respective parts constituting the objects. Thus, the parts can be instantly distinguished.

What is claimed is:

1. A method for displaying three-dimensional objects on a screen, comprising:

displaying a plurality of three-dimensional objects which are sectioned by a selected plane;

determining the three-dimensional coordinates corresponding to a selected point as a measurement point on the screen displaying the sectioned plurality of three-dimensional objects;

calculating the horizontal and vertical distances between surfaces of the plurality of three-dimensional objects on the sectional plane passing through the measurement point; and displaying the values of the calculated horizontal and vertical distances together with dimension lines.

2. The method for displaying three-dimensional objects as defined in claim 1, wherein the sectional display is updated on an instruction to move the position of the plane which sections the three-dimensional objects and the values of the horizontal and vertical distances and the dimension lines are updated with respect to a new measurement point determined on the new sectional plane.

3. A method for displaying three-dimensional objects on a screen, comprising:

displaying three-dimensional objects sectioned by a selected plane, wherein the sections of the three-dimensional objects are displayed in distinguishable solid colors representing different parts.

4. A computer-readable storage medium storing a program for execution on a computer to:

display three-dimensional objects on a screen;

accept the selection of a sectional plane of the three-dimensional objects displayed on the screen;

display the three-dimensional objects sectioned by the selected plane;

accept the selection of a point on the screen which displays the sectioned three-dimensional objects;

determine the three-dimensional coordinates corresponding to the selected point as a measurement point;

calculate the horizontal and vertical distances between the surfaces of the three-dimensional objects; and display the calculated values of the horizontal and vertical distances together with dimension lines on the screen.

5. The storage medium as defined in claim 4, wherein the program is further operable to:

accept the instruction to move the sectional plane of the three-dimensional objects;

on the instruction to move the sectional plane, update the display of the sectioned three-dimensional objects;

determine a measurement point corresponding to the new sectional plane; and update the values of horizontal and vertical distances and dimension lines with respect to the measurement point.

6. A computer-readable storage medium for execution on a computer to:

display three-dimensional objects on a screen;

accept the instruction to select a sectional plane on the three-dimensional objects displayed on the screen; and display the three-dimensional objects sectioned by the selected sectional plane, the sections of the three-dimensional objects being displayed in distinguishable solid colors representing different parts.

* * * * *

UNITED STATES PATENT AND TRADEMARK OFFICE
CERTIFICATE OF CORRECTION

PATENT NO. : 6,683,607 B1
APPLICATION NO. : 09/636098
DATED : January 27, 2004
INVENTOR(S) : Kazuyuki Matsuda et al.

It is certified that error appears in the above-identified patent and that said Letters Patent is hereby corrected as shown below:

Title page, at (73) Assignee:
After "Tokyo, JP" insert -- Toshiba Corporation, Tokyo, (JP) --.

Signed and Sealed this

Thirtieth Day of January, 2007

JON W. DUDAS
*Director of the United States Patent and Trademark Office*